No. 687,736. Patented Dec. 3, 1901.
J. H. ELWARD.
PLANTER.
(Application filed Jan. 17, 1895.)
(No Model.) 7 Sheets—Sheet 1.

Witnesses:
W. H. Edwards
Arthur L. Bryant

Inventor
John H. Elward
by H. H. Bliss
Atty.

No. 687,736. Patented Dec. 3, 1901.
J. H. ELWARD.
PLANTER.
(Application filed Jan. 17, 1895.)
(No Model.) 7 Sheets—Sheet 2.

Witnesses:
W. H. Edwards.
M. B. May

Inventor,
John H. Elward
by H. H. Bliss
Attorney.

No. 687,736. Patented Dec. 3, 1901.
J. H. ELWARD.
PLANTER.
(Application filed Jan. 17, 1895.)
(No Model.) 7 Sheets—Sheet 3.

Witnesses:
Frank Blair Rives
M. B. May

Inventor
John H. Elward
by H. H. Bliss
Attorney.

No. 687,736. Patented Dec. 3, 1901.
J. H. ELWARD.
PLANTER.
(Application filed Jan. 17, 1895.)
(No Model.) 7 Sheets—Sheet 4.

Witnesses—
W. H. Edwards
M. B. May

Inventor
John H. Elward
by N. H. Bliss
Atty.

UNITED STATES PATENT OFFICE.

JOHN H. ELWARD, OF PEORIA, ILLINOIS.

PLANTER.

SPECIFICATION forming part of Letters Patent No. 687,736, dated December 3, 1901.

Application filed January 17, 1895. Serial No. 535,254. (No model.)

*To all whom it may concern:*

Be it known that I, JOHN H. ELWARD, a citizen of the United States, residing at Peoria, in the county of Peoria and State of Illinois, have invented certain new and useful Improvements in Planters; and I do declare the following to be a full, clear, and exact description of the invention, such as will enable others skilled in the art to which it appertains to make and use the same, reference being had to the accompanying drawings, and to the characters of reference marked thereon, which form a part of this specification.

Fig. 7 is an inside face view of one of the wheels on the right hand in Fig. 1 detached. Fig. 8 is a face view from the outside of the same. Fig. 9 is a vertical section on the line $z\,z$, Fig. 7. Fig. 15 is a rear view of the axle detached. Fig. 16 is a face view of one of the wheels on the left hand detached. Fig. 17 is a section on the line $t\,t$ of Fig. 16. Fig. 18 shows the washer for the wheel-hub. Fig. 19 is a face view of the rotary connecting device which joins the two left-hand ground-wheels together. Fig. 20 is a section of the same and of its bearing or support on the axle on line $t'\,t'$ of Fig. 19 looking in the direction of the arrow. Fig. 20$^a$ is another section through Fig. 19. Fig. 21 is a perspective of the driving sprocket-wheel. Fig. 22 is a vertical section thereof and of its bearing. Fig. 23 is a section of a sufficient part of the machine to illustrate the relations of the wheel-frame and the runner-frame. Fig. 25 is a section on the line $y'\,y'$ of Fig. 24. Fig. 26 is a side view of the check-row heads. Fig. 27$^b$ is a section through the seeder-frame.

My present improvement relates to planters, particularly of that class in which the supporting-wheels are adapted to cover the planted grain; and the object of my present improvements is to so construct such wheels and relate them to the other parts of the machine as to permit of various adjustments.

Another object of the present improvements is to provide means for actuating the planting or seed-dropping mechanism from said wheels.

With these and other ends in view my invention consists in the construction and arrangement of parts that will be hereinafter pointed out and described.

In the drawings I have shown complete a planter of one of the common form considered as a whole, it having a wheel-frame and a runner-frame in front thereof and hinged thereto; but from the description appearing below and from an inspection of the drawings it will be seen that a number of the features of improvement, considered by themselves, can also be employed in the construction of planters of any of several well-known forms—as, for instance, in those in which use is made of but a single frame mounted on the ground-wheels and carrying the seeding mechanism and other parts.

The wheel-frame comprises the axle A and bars B B, extending forward from and secured rigidly to the axle. The axle is indicated as a whole by A and can be of either of several forms. For the purpose of illustration I have shown three forms in the accompanying drawings, though others will suggest themselves to those acquainted with these mechanisms. That illustrated in Figs. 1, 4, 15, and others is formed preferably of two bars placed parallel to each other and held throughout certain portions apart from each other by suitable spacing devices, as shown at $a$ at the center and at $a'$ at the ends, the latter being comparatively small spacing-washers held by bolts $a^2$. By forming the axle in this way I provide comparatively long slots or passage-ways, as at $a^4$, near the ends to permit the attachment of the wheels and their adjustment bodily out or in and axially, as will be described.

Figure 1:
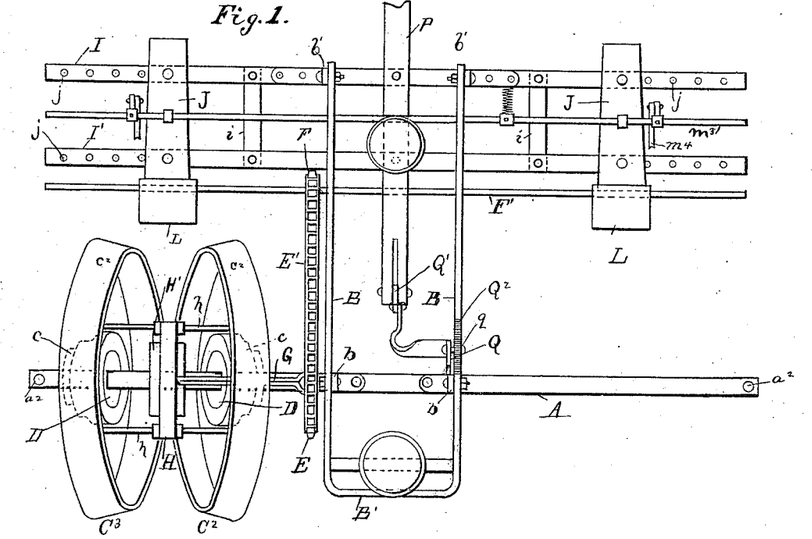
Figure 1 is a plan view showing parts of a planter embodying some of my improvements.

The wheels are arranged in pairs, one pair at each end of the axle, and may be substantially duplicates throughout; but for convenience I have indicated those on the right-hand side by C C' and those upon the left-hand side by $C^2$ $C^3$. They are all mounted in a similar way, so that each can be adjusted as desired. Each has a hub $c$ with a relatively large bearing-aperture $c'$ and a peripheral rim $c^2$ of the desired width. Each is mounted upon a skein or support D. The latter comprises mainly the bearing-sleeve $d$, the fixed inner flange $d'$, and the detachable outer flange or washer $d^2$. It has a centrally-situated angular aperture $d^4$, which is of a width substantially equal to the horizontal dimensions of the axle, but is of a depth greater than the vertical dimensions thereof, so that this skein or support is capable of movement vertically relatively to the axle and also of movement longitudinally thereon. The vertical movement which is desired is of an oscillatory character, and in order to furnish an axis I pass a hinge or pivot pin $d^5$ through the aperture $d^4$ on such lines that it can pass through the slot $a^4$ of the axle. Hence, as will be seen, the skein can be rocked in such a way as to throw its ends up or down, as desired. When the parts are in position, the hub $c$ of the wheel is fitted to the exterior of the sleeve part of the skein, with the flange $d$ lying inside and the flange or washer $d^2$ on the outside to hold it in place. If it be desired to arrange the wheel so that the transverse plane thereof (the plane transverse to the axis) shall be inclined to the horizon and to the axle, the skein is loosened and the ends are moved up and down, respectively, until the wheel is brought into the desired planes. The skein is held by means of a slotted clamp-plate D', which is rigidly fastened to or formed with the end part thereof and which has the slot $d^6$ lying transverse to the slot or passage $a^4$, and $D^2$ is a bolt which passes through this slot and between the two parts of the axle, by which the skein can be loosened or clamped after adjustment in any desired position. As said, each wheel is adjustable in the manner above described, and it will now be seen that I provide for all of the arrangement of the wheels advantageous for use in any of the numerous conditions experienced in using planters. It is now well known that covering devices for corn and other seed are of a superior nature when they consist of two wheels, (for each coverer,) one running near to the row and along one side thereof, while the other is correspondingly arranged as to the other side of the row, and machines with such pairs of wheels or coverers have been heretofore made; but, so far as I am aware, the wheels have not been adjustable in the ways I have above described either bodily, separately, along the axle out and in, or axially, so as to vary the angle of inclination of the rotation plane to the horizon. In most of the earlier machines of which I have knowledge these wheels have been mounted on spindles or supports which were fixed in relation to the horizontal and vertical planes. In one case the spindles were inclined downward and capable of adjustment around fixed vertical pivots, but their inclination to the horizontal was always fixed. The conditions which are to be met in using these planting-machines vary greatly, not only when considering the circumstances of soil, &c., characterizing different localities, but also when considering the changes with respect to moisture, temperature, &c., incident to any particular locality. Under some conditions it is desirable that the covering-wheels should be placed at an inclination greater, and sometimes that they should be placed at an angle less, than is advantageous under others, and in some places or when planting certain seeds it is desirable to have the coverer substantially the same as is provided by the ordinary single wheel, and it will be seen that all of these requirements are met by the construction of machine presented herein. The two wheels of each pair can be rocked to their middle position and can be moved into close proximity—that is to say, so that both will lie in rotation planes at right angles to the axle and so as to provide a substantially continuous peripheral surface in the plane of the dropping mechanism. Either wheel or either pair of wheels can be used for actuating the planting mechanism. As shown, the gearing for this purpose is connected with and actuated by the wheels $C^2$ $C^3$ on the left-hand side of the machine.

E is a sprocket-wheel mounted at a suitable place on the axle A and connected by the chain E' with the sprocket-wheel F on the shaft F', which actuates the seed-droppers, to be described. Wheel E may be mounted in any suitable way. As shown, it is provided with a bearing at $E^2$, which is adjustably fastened to the axle, it having a flange or plate $e$, with a bolt which can be fastened at one or another of several points.

G is an arm secured to and extending laterally from the wheel E. It engages with the wheel $C^2$, passing between the spokes, or otherwise arranged to engage therewith. The aperture or passage through the wheel should be of such dimensions as to permit the wheel to be rocked into any one of its several possible positions.

The wheels $C^2$ and $C^3$ might not revolve uniformly together as the result of unevenness of the ground surface or should clods or other projections be met with, and hence there are times when the outer wheel $C^3$ might rotate more or less during the period when the inner wheel $C^2$ is stationary. To guard against the stopping of the sprocket-wheel E from such causes, I provide a connection between the wheels $C^2$ and $C^3$ which, while permitting them to be either or both adjusted in any of the ways above described, yet insures that neither can revolve without causing the other to move similarly.

H is a ring or plate mounted on a thimble or bearing H', adjustably secured to the axle and situated in transverse planes midway between the two wheels $C^2$ and $C^3$. It carries laterally-projecting arms $h$ $h$, some extending toward and engaging with the wheel $C^2$ and some extending toward the wheel $C^3$. They engage loosely with the wheels and insure that when either is rotating the other will also.

The framework which connects the wheel-frame with the runner-frame may be of any preferred sort. As above said, bars B B are shown for this purpose, these being provided, preferably, by bending a steel bar into a U form, of which the said bars B B constitute the side parts, they being joined by the rear cross part B'.

$b$ $b$ are standards or uprights secured to the axle for the purpose of elevating the connecting-frame. The bars B B extend forward to the front part of the runner-frame and are hinged thereto by uprights $b'$ $b'$.

The runner-frame consists mainly of two parallel transverse bars I I', together with a suitable number of brace-bars $i$. At the outer ends of these bars are placed the devices for opening the furrow for carrying, feeding, and dropping the seed and for regulating its escape into the furrows, and also the check-row mechanism. Each of the sets of devices for the purposes just referred to may be of any desired character as concerns these features of the invention which have been above described; but in order to have the runners or furrow-openers and the seeding mechanism variable in their positions to correspond to the above-described adjustments of the covering-wheels I attach them to the forward frame in such a way that they also can be adjusted laterally. At $j$ $j$ there are apertures in the bars I I', by which the carrying-bars J of these devices can be secured in any one of several positions, as will be understood. The runners or furrow-openers K should be put in proper alinement with respect to the opening between the wheels.

L L indicate conventionally the seedboxes. These are to contain any of the well-known or any preferred form of feeding or dropping mechanism.

F' is the shaft which actuates the droppers or seed-delivering devices, it carrying the aforesaid wheel F, driven by the sprocket-chain E'. The machine may be used either in such a way as to deliver the seeds one or more at a time to a valve in the seed-tube at J', actuated by the check-row devices or by hand, or the check-rowers or other intermittingly-acting mechanism can be connected to the delivering mechanism through slides and pawls or any other well-known means, or the check-rowers being out of action and the valves being open the shaft F' and its coacting parts can be utilized to drill continuously.

The check-row mechanism has fork-lever M, a pair of rear guide-rollers M' $M^2$, and front guide-rollers N N'. These parts are supported on a bar or head O, secured to the outer ends of the frame-bars I I'. The fork-lever M has its active end in the path of the wire and at the other it is secured to the rock-shaft $m^3$, which is connected to the dropping mechanism by a link $m^4$ or in any other preferred way, there being one or more springs $m^5$ to return these parts to their normal position, or said rock-shaft may be arranged as illustrated in Figs. 28 to 34.

The front guide for the wire has by preference two lower rollers N N', mounted on horizontal axes, and a vertically-arranged roller $N^2$. The latter is carried by a sliding bar $n$, which is supported in a guide provided by means of the bars $n'$ $n'$, secured to the forward end of the cross-bar O.

$n^2$ is a pivoted latch or lock hinged to the top of the sliding bar $n$. $n^3$ is a cord fastened at one end to this latch and extending to the driver's seat.

$n^4$ is a stop for the end of the latch, and when the latter is against it the bar $n$ and the roller $N^2$ are held rigidly in normal position.

When the driver desires that the wire should be disengaged from the machine, he draws on the cord $n^3$, which lifts up the latch $n^2$, and thereupon the slide $n$ is instantly forced outward by the tension and gravity of the wire bearing against the roller $N^2$. After he has turned the machine or whenever necessary he can again replace the wire in the obvious manner—namely, by laying it upon the rollers N N' and then pushing in the roller $N^2$ until the catch $n^2$ drops behind the stop $n^4$.

P indicates the tongue. It is rigidly connected to the cross-bars I I' and extends back therefrom to a line suitably near the axle. With it there is adjustably connected a lifting mechanism which comprises the lever Q and a link Q'. The lever Q is pivoted at $q$ to one of the frame-bars B. $Q^2$ is a ratchet-segment secured to the bar, and with it a spring-actuated detent on the lever engages in whatever position the lever may be set. With these devices the desired angle of inclination of the runner-frame and the wheel-frame can be obtained and held to provide for meeting the different conditions experienced in the work. The runner-frame can be adjusted forward and back relative to the wheel-frame, so as to place the seed-delivering devices closer to or farther from the line where the wheels approach each other the nearest, as may be desired. The bars B are provided with a series of apertures $b^2$ to receive the hinge-bolts at the front end, and the tongue has a series of apertures, as $p$, for receiving the link-pivot at the rear.

Figure 2:
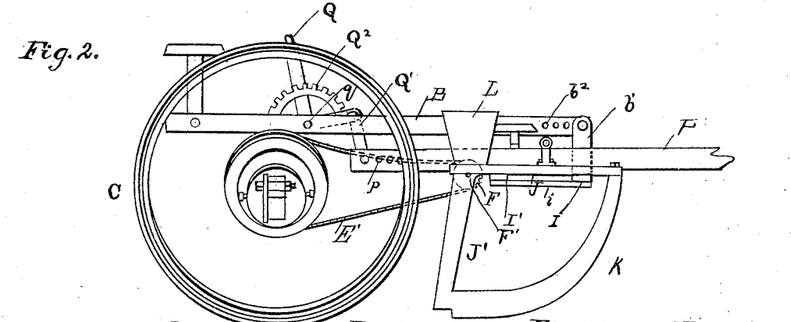
Fig. 2 is a side elevation from the right-hand side.
Figure 3:
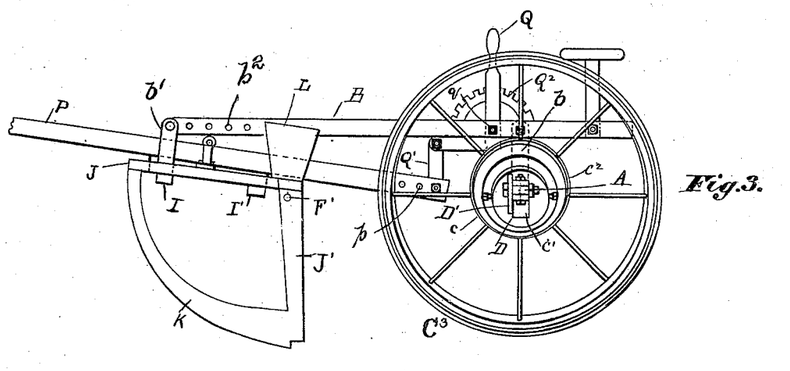
Fig. 3 is an elevation from the left-hand side.

While I have above described the more or less conventional illustration of the seeding mechanism and runner-frame shown in Figs. 1, 2, and others, I have in Figs. 28 to 37, inclusive, illustrated that construction and arrangement of devices for dropping the seed which I at present prefer. Referring to the last-said figures, it will be seen that the rock-shaft $m^3$ can be placed behind and parallel to the seeder frame-bars I I', this shaft being connected to the levers of the check-rowers by the cranks 76 and the links 78. The rock-shaft $m^3$ is connected by cranks with the pawl-frames 60, of which there is one for each seeding-box L L. Each pawl-frame carries a pivot or pintle 63 for connection with the rock-shaft and has two pawls 64 65, adapted to engage with the toothed seed-wheel 71. The pawls are held normally by springs against the periphery of the wheel; but the one at 65 can be held permanently out of the line of the teeth on the wheel by a pin 72, which can be so placed as to have the heel end 74 of the pawl rest against it when the pawl is in the position shown by the dotted lines in Fig. 31. At other times the pin 72 is placed in the socket or aperture at 73. To prevent the seed-wheel 71 from rotating undesirably, I use on one side the stop 86 and on the other the stop-arm 85, held by a spring 84. To properly control the seed after it drops through the plate 71, I arrange a tube 79 to receive it, the bottom of this tube being closed and opened by means of the sliding valve 70. This valve can be actuated from the rock-shaft $m^3$ by a crank-arm at 69 and a detachable link 75. The seed-tube J' has a passage $J^3$ below the valve 70. Near the lower end of this passage the bottom valve 80 is placed, and it is actuated from the valve 70 by means of a lever 81 and link or pitman 83. The lever 81 has a finger $81^a$ engaging with the slide-valve 70. At $81^b$ it has a slot in which the pitman 83 is pivoted, there being a stop at $81^c$. At the lower end the pitman or link 83 is pivoted to an arm $80^a$, attached to the valve 80. There are two apertures to receive the pivot of the link. When in the upper aperture, the valve is adapted to vibrate to and fro. When placed in the lower aperture, the valve will be held permanently open, as shown by the dotted lines at 68 in Fig. 37. When the check-rower is in operation, the pawl 65 is placed in its inoperative position (dotted lines, Fig. 31) and is locked by the pin 72. Then at each movement of the check-row lever the pawl 64 moves one step—that is, brings the holes in the seeder-plate one at a time over the tube 79. The rock-shaft $m^3$ at the time it commences to move the pawl-frame also moves the plate 70 under the tube 79, and therefore the seed which an instant afterward drops through the plate 71 is caught and held until the spring 66 returns the rock-shaft and pawl, at which time the plate 70 also moves backward, whereupon the seed in the tube 79 can drop through the aperture in said plate. This seed drops through the passage $J^3$ upon the valve 80, which temporarily holds it; but at the next action of the check-row lever and just before the rock-shaft starts the seed-plate 71 said shaft again draws forward the valve-plate 70 to close the tube 79 and at the same time draws forward the lever 81, which through the link 83 draws up valve-arm $80^a$ and opens the valve 80 and drops the seed which at the previous step fell upon it.

Figures 34, 35, 36, 37:
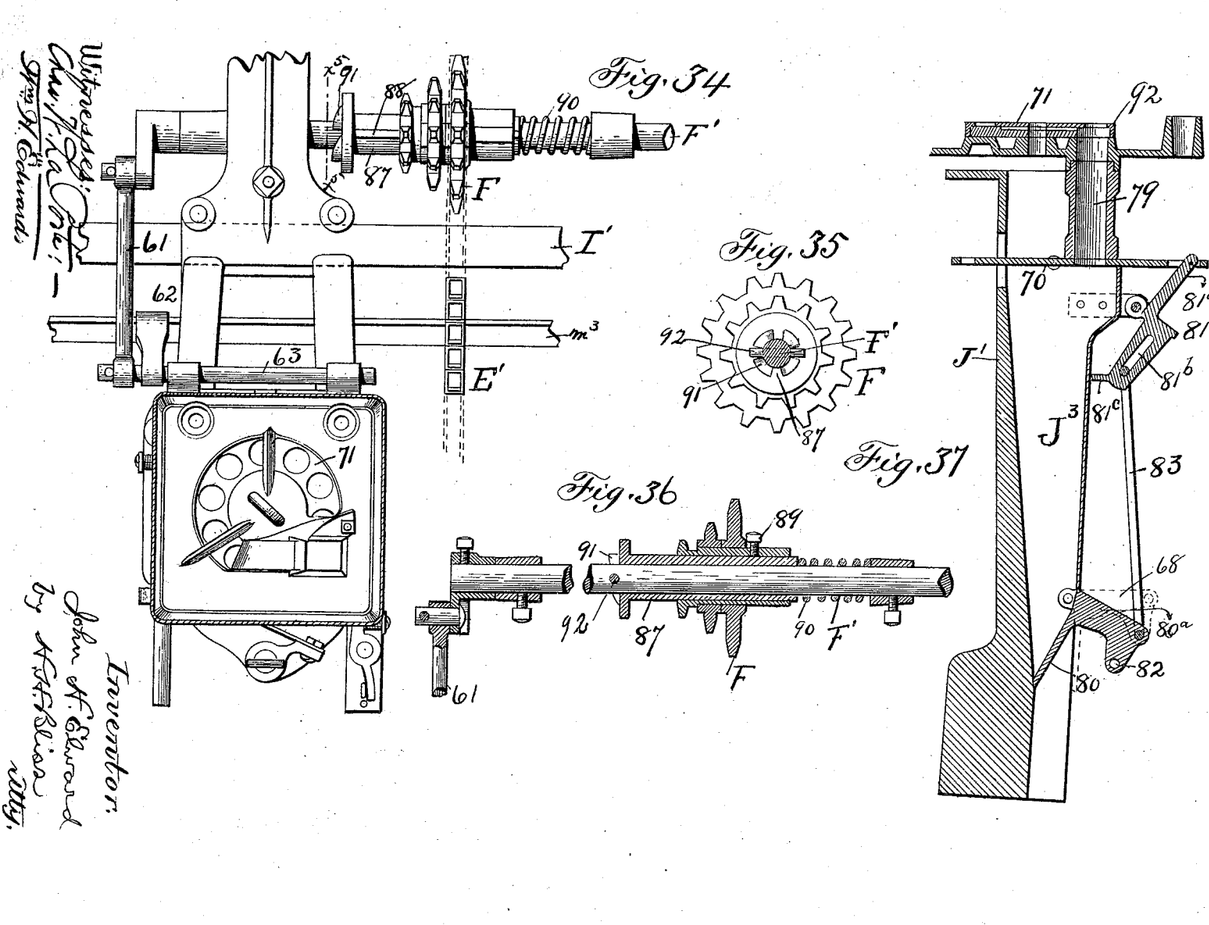
Fig. 34 is a plan view of that end of the runner-frame to which the drilling devices are applied.
Fig. 35 is a section on the line $x^5\,x^5$ of Fig. 34.
Fig. 36 is a section showing the sprocket-gearing on the drilling-shaft.
Fig. 37 is a vertical section of the dropping tube and valve mechanism on a larger scale.

To insure that the valve-plate 70 shall cut off the tube 79 before the valve at 80 is opened, there is a temporary disconnection as concerns the lifting action of the link 83 of the lever 81 with the valve 80 and the link 83— that is to say, the slot at $81^b$ insures that the lever can swing through part of its path without lifting upon the link; but before the lever completes its swing it opens the valve 80 quickly and as it returns quickly closes it, the arm $80^a$ being weighted sufficiently to insure the rapid closing of the valve.

When the machine is used for drilling, as will be described, the link 75 is disengaged from the valve-plate 70 and the valve 80 is held open by having the hook of link 83 placed in the lower aperture 82 of the valve-arm $80^a$, the part 70 being at such time held with its aperture under the tube 79. The drilling is accomplished as follows: As described above, the chain E' engages with sprocket-wheel F on the shaft F', which in the arrangement of parts shown in Figs. 28 to 36 is substantially the same as that in Fig. 1 and others, though here shown somewhat farther forward. When this chain is in action and the shaft F' is rotating, the latter imparts intermitting motion to the pawl-frames 60 through a pitman 61, which is pivoted to a crank-arm 62 on the rock-shaft $m^3$, and through these moves the pawl-frame. When drilling, both the pawls 64 and 65 are used with each seed-plate, so that the latter makes two steps at each motion of the rock-shaft or each revolution of the shaft F'. At this time the links or pitmen 78 of the check-row devices are thrown out of action.

To vary the speed of rotation of shaft F', I employ a series of sprocket-wheels at F of different sizes. They are secured to a sleeve which can be adjustably fastened by a set-screw at 89 to an inner sleeve 87, having a spline at 88. The sleeve 87 is loose on the shaft F', but is arranged to engage therewith, its end 91 being formed with ratchet or clutch teeth, which are adapted to engage with a pin 92, carried by the shaft, as represented in Fig. 35. The sleeve is pushed by a spring 90 in a direction to cause the clutch-teeth to engage the said pin 92, and yet permits a backing ratchet action of the parts when this is necessary.

I have above described the essential parts of a machine of one form in order that my improvements may be understood; but, as stated, there can be modification in a number of respects.

Figure 4:
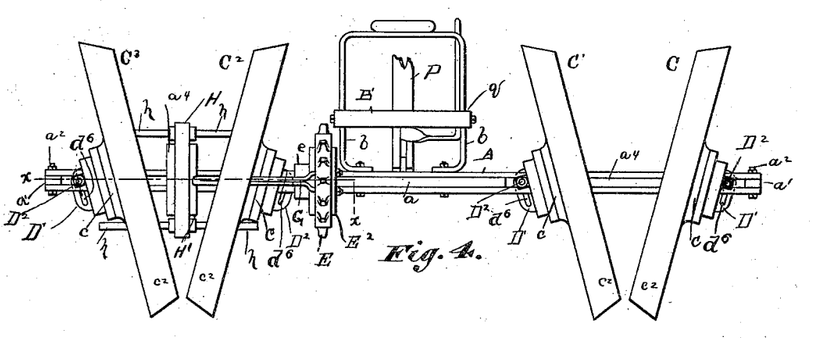
Fig. 4 is a rear elevation.
Figure 5:
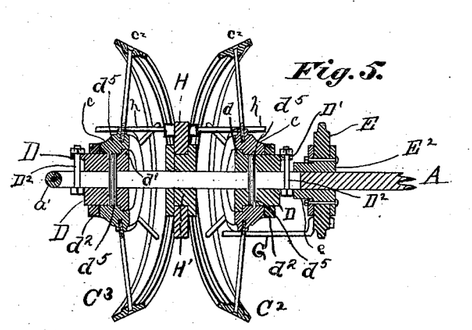
Fig. 5 is a horizontal section on the line $x\,x$ of Fig. 4.
Figure 6:
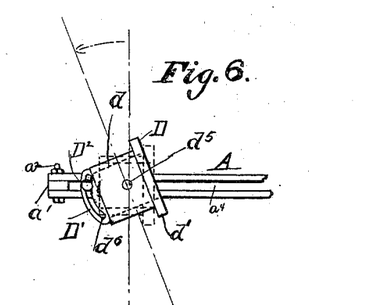
Fig. 6 is a front view showing the adjustable wheel-skein and part of the axle.
Figures 7, 8, 9, 15, 16, 18, 19, 20, 20A, 21, 22, 23:
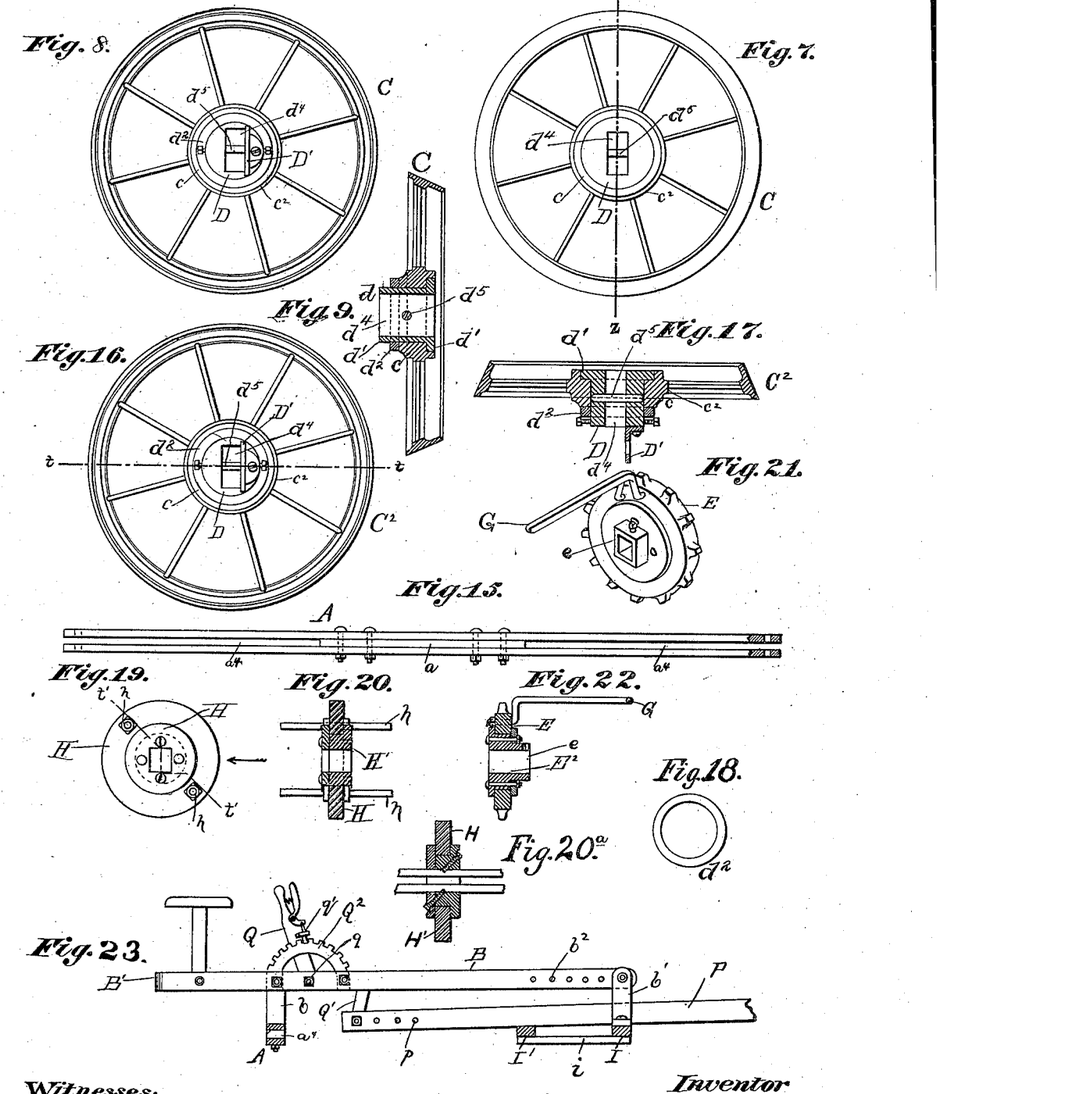
Figures 10, 11, 14:
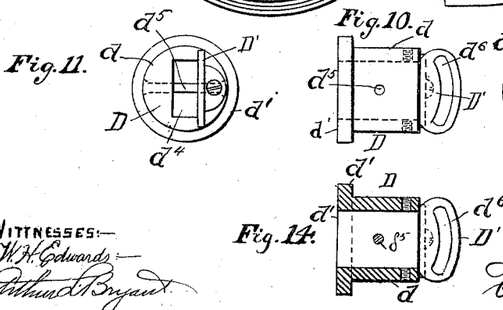
Fig. 10 is an elevation of one of the adjustable skeins detached.
Figs. 11, 12, and 13 are respectively end elevations and a cross-section of the same.
Fig. 14 is a longitudinal section.
Figures 12, 13:
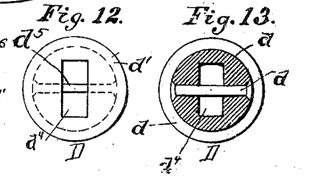
Figure 24:
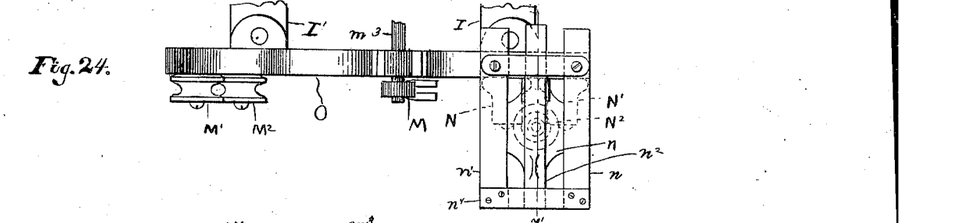
Fig. 24 is a plan view of one of the check-row heads detached.
Figures 25, 26, 27, 27A:
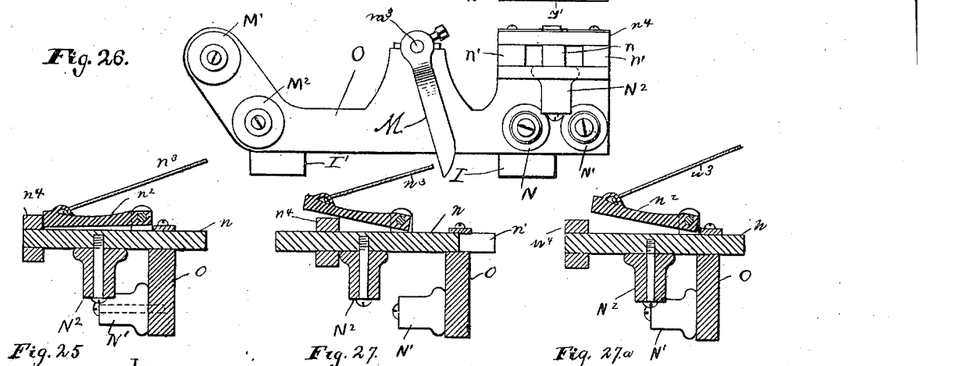
Figure 27:
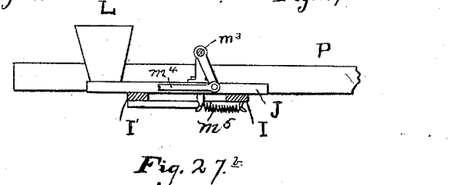
Figs. 27 and 27$^a$ show the wire-detaching devices in two of their positions.
Figure 28:
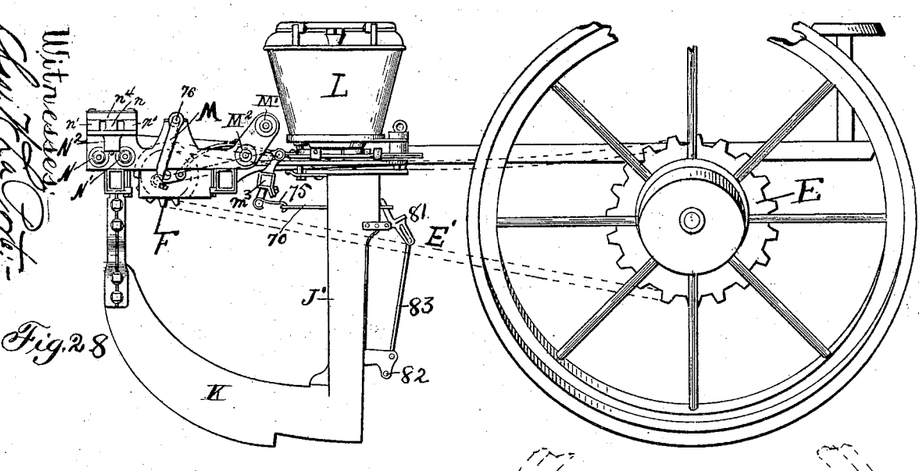
Fig. 28 is a side view of mechanism on the front or runner frame complete.
Figure 29:
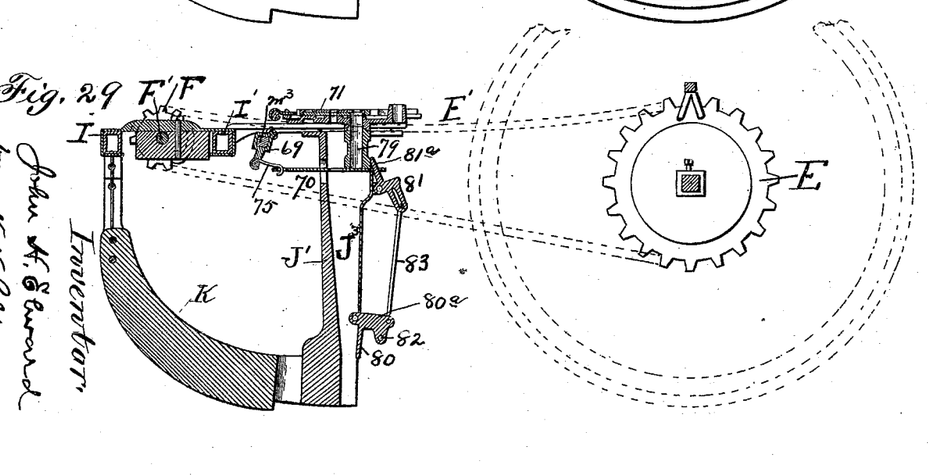
Fig. 29 is a longitudinal section of parts of the runner mechanism.
Figures 30, 31, 32, 33:
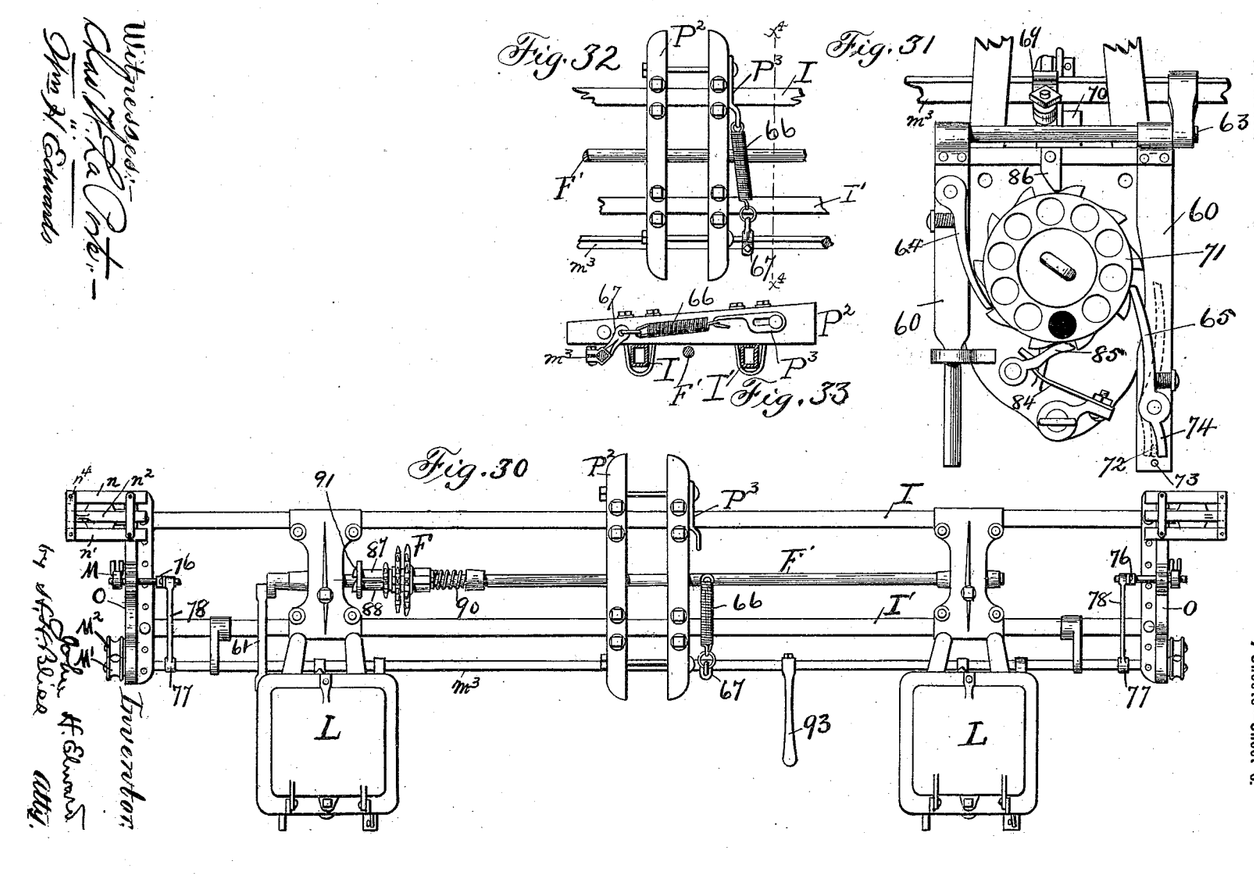
Fig. 30 is a plan view of the complete runner-frame and attachments shown in Figs. 28 and 29.
Fig. 31 is a plan view of one of the sets of seed-dropping devices.
Fig. 32 is a plan view of the central part of the runner-frame, as in Fig. 30.
Fig. 33 is a section on the line $x^4\,x^4$ of Fig. 32.

By examining the drawings, Figs. 4, 9, and 17, it will be seen that the edges of the wheels, respectively, which are adjacent to the other nearest wheel overlap the hub and skein parts. They are extended in this way sufficiently far to insure that the two wheels of each pair can be so placed in upright positions as to have them touch each other at the peripheries. When they are so placed, they furnish, practically, the equivalent of a single wheel capable of the uses of the single covering-wheels now used in most planters. In order to increase the seed-covering action of the wheels, I flare the rims somewhat, as shown in the drawings, the result being that they act as plows, the edge of larger diameter first cutting into the soil and the flared periphery then moving it inward toward the furrow; but in this respect I wish it to be understood there can be modifications, and the rims may be parallel to the axis, if preferred.

I herein refer repeatedly to the wheels as being "inclined," meaning that the wheels are or are adapted to be placed in a plane other than that which is at right angles to the axle, or what may be called the "axle-line" across the machine. It is now well known that machines may be constructed with inclined wheels, but which do not have through-axles—that is, axles extending continuously from outside to outside of the machine-frame—relatively short axles or spindles, separated from each other, being used at each side of the machine, one for each wheel, and many of the features of improvement which I have here presented are applicable to said machines, as well as to one having a continuous axle.

In some of the earlier machines separate spindles for each wheel of each pair were used, which spindles were pivoted to a carrier lying between the wheels, each spindle also carrying a slotted plate for changing the position of the spindle. The wheels in these machines were not capable of some of the principal adjustments which I attain. With them the angle of the plane of the wheel to the horizon could not be varied, the only variation possible being a change in the angle of the plane of the wheel to the vertical plane of the seed-dropper—that is to say, the space between the front parts of the wheels could be widened or shortened, but there was no vibration possible of the wheels in planes parallel to those of the axle. In my case the axle or wheel-support (which is shown as a part extending integrally or continuously from side to side, but may be formed of two or more wheel-supporting portions, with or without the central connecting parts) has at each end a part which supports both of the pair of companion wheels, which part is adapted to be slipped through either wheel to permit either of the described adjustments—that is to say, the wheel-support proper carries the two companion wheels in common and can be separated or regarded as separated from the rest of the frame while still supporting both wheels, whereas in the earlier machines referred to each wheel-spindle was independent of the others and detachable with but one wheel, and the latter could not be adjusted independently of its spindle or axle. However I do not mean that wheels cannot be mounted so as to be adjustable in my way on such individual spindles whether the latter be themselves adjustable or not, for it will be seen that my adjustable skeins or equivalents could be employed in connection with the earlier independent spindles and attain some of the purposes of my invention.

What I claim is—

1. In a planter, the combination with the axle of the carrying and covering wheel, adjustable angularly on said axle, whereby it can be arranged to move through a vertical plane or through a plane at either side of, and inclined to said vertical plane, substantially as set forth.

2. In a planter, the combination with the axle, and the carrying and covering wheel angularly adjustable on said axle, of means engaging with the axle for securing the wheel in position to move through a vertical plane at right angles to the axle or in a position in which its upper portion will be inclined inwardly from said vertical plane, substantially as specified.

3. In a planter, the combination with the axle, of a carrying-wheel mounted on the axle, and adapted to be adjusted longitudinally thereof, and means for securing said wheel to said axle to have its upper portion extend at any of several angles of inclination, on either side of a central vertical plane, substantially as set forth.

4. In a planter, the combination with the axle, of a two-part carrying and covering wheel mounted on the axle, each part of said wheel being angularly adjustable on the axle across a central vertical plane independently of the other, substantially as set forth.

5. In a planter, the combination of a runner-frame, a wheel-frame, an axle detachably connected to said wheel-frame, a two-part carrying and covering wheel having each part mounted on said axle, and means for adjusting each part of said wheel, both above and below the axle inwardly and outwardly from a vertical position independently of the other part substantially as set forth.

6. In a planter, the combination of an axle, a covering-wheel, a support for said wheel, fitted to the axle and means for adjusting said support about an axis extending transverse of the axle, substantially as set forth.

7. In a planter, the combination of an axle, a covering-wheel, having its peripheral surface inclined to its axis, fitted to said axle, and adapted to be adjusted longitudinally thereof, and means interposed between said axle and wheel, and adapted to be adjusted vertically and to hold the wheel at either of several angles of inclination, substantially as set forth.

8. In a planter, the combination of an axle, a two-part covering-wheel mounted on said axle, the peripheral surface of one part of said wheel being inclined oppositely to the peripheral surface of the other part thereof, whereby a V-shaped groove will be formed in the periphery of the wheel when said parts are brought together, and means for securing said covering-wheel to the axle in either of several inclined positions, substantially as set forth.

9. In a planter, the combination of an axle, a covering-wheel consisting of two independent parts each mounted on the axle and having its peripheral surface inclined to its axis, the peripheral surface of one part of said wheel being inclined oppositely to the corresponding surface of the other part, each of said parts being adjustable longitudinally of the axle or wheel-support, and means for adjusting each part angularly on said axle independently of the other, substantially as set forth.

10. In a planter, the combination with an axle, of a covering-wheel having a central support with a passage for the axle of greater cross dimensions than the axle, and means for securing the said support and axle together, substantially as set forth.

11. In a planter, the combination with an axle, of a covering-wheel having a central support or skein with a passage for the axle, the vertical dimensions of said passage being greater than the corresponding dimensions of the axle, and a lug or plate attached to the skein and adapted to be connected with the axle, whereby the wheel can be held at any desired angle of inclination to the axle, substantially as set forth.

12. In a planter, the combination with an axle, of a covering-wheel having a central support pivotally mounted on said axle, and a locking-plate, adapted to be engaged with the axle and wheel-support whereby the wheel can be adjusted angularly of the axle and secured in any desired position, substantially as set forth.

13. In a planter, the combination with an axle, of a covering-wheel having a hub loosely surrounding a skein on the axle, a pivot-bolt extending through the skein and the axle, and means for locking the hub and axle securely together, substantially as set forth.

14. In a planter, the combination of an axle having a longitudinal slot, $a$, formed therein, a wheel mounted loosely on a skein on said axle, a pivot-bolt, or pin extending through the skein and slot, $a$, and a lock-plate adapted to rigidly connect the said skein and axle, substantially as set forth.

15. In a planter, the combination of an axle having a slot $a$, formed therein, a skein or wheel-support loosely surrounding the axle and having a flange at one end and a locking plate or lug at the other end, a fastening-bolt extending through said plate and the slot, $a$, in the axle, a wheel fitted on said skein, and a collar for holding the wheel-hub against the annular flange on the skein, substantially as set forth.

16. In a planter, the combination with a seeding mechanism, and a wheel for actuating said mechanism, of a covering-wheel mounted on a non-rotatable axle, and means adapted to be actuated by said wheel for operating the driving-wheel of the seeding mechanism, substantially as set forth.

17. The combination with the two inclined covering-wheels, of the intermediate wheel, and means connecting it with both of the covering-wheels for transmitting rotation from one to the other, substantially as set forth.

18. In a planter, the combination with a seeding mechanism, and a driving-wheel for actuating said mechanism, of a covering-wheel, and an arm carried by the driving-wheel of the seeding mechanism and extending into the path of the spokes of the covering-wheel, substantially as set forth.

19. In a planter, the combination of a wheel for actuating the seeding mechanism, two covering-wheels, a wheel intermediate of and adapted to be actuated by both covering-wheels, and an arm connected with the actuating-wheel of the seeding mechanism and extending into the path of one of the covering-wheels, substantially as set forth.

20. In a planter, the combination of an axle or wheel-support, two covering-wheels rotatably mounted on said axle, a wheel arranged between and having oppositely-extending arms projecting into the paths of the spokes of both said covering-wheels, and means for actuating the seeding mechanism from one of said covering-wheels, substantially as set forth.

21. In a planter, the combination with the wheel-frame and the runner-frame, of the intermediate connecting-frame joined to the wheel-frame and pivoted to the forward part of the runner-frame, and having that part over the rear part of the runner-frame elevated to permit the upward swinging of said rear part of the runner-frame, substantially as set forth.

22. The combination with the rear frame, having the two pairs of wheels, one pair on each side, of the forward runner-frame adjustably connected to the wheel-frame, whereby the said runner-frame and the seeding mechanism can be bodily moved back relatively to the pairs of wheels, while in operative positions, substantially as set forth.

23. In a planter, the combination of the wheel-frame, the runner-frame, the uprights, $b'$, on the runner-frame, and an intermediate frame connected to the wheel-frame and adapted to be connected at any of several points in its length with the uprights, $b'$, on the runner-frame, substantially as set forth.

24. In a planter, the combination of the wheel-frame, the runner-frame, the uprights, $b'$, on the runner-frame, the tongue connected to the runner-frame and extending rearwardly therefrom, an intermediate frame having its side bars connected with the wheel-frame and provided near its forward end with a series of apertures, $b^2$, a bolt connected with each upright, $b'$ on the apertures, $b^2$, and a link having one end connected to the said intermediate frame and its other end adjustably connected to the tongue, substantially as set forth.

25. A check-rower, having a wire-guide formed of the horizontal wire-supporting rollers $N'$, the vertical wire-retaining roller $N$, the sliding carrier for the vertical roller, and the lock for said slide, adapted to normally prevent movement of said carrier under the strain of the wire, substantially as set forth.

26. The combination with the check-row-wire guide of the vertical wire-retaining roller $N$, the sliding support for said roller, the stationary guide permitting said support to move longitudinally toward and from the wire, and the latch, substantially as set forth.

27. The combination with the check-row-wire guide of the vertical wire-retaining roller $N^2$, the sliding support for said roller, the stationary guide permitting said support to move longitudinally toward and from the wire, and the latch, substantially as set forth.

28. In a planter, the combination of a frame having supporting-wheels, two seeding mechanisms, one at each side of the frame, comprising rotary dropping-plates or seed-wheels, reciprocating devices each carrying two pawls for operating a dropping-plate at each movement of the reciprocating device, means for locking one of the said pawls out of action, rotary mechanism driven from the wheels and connected with the said reciprocating devices, and checking devices whereby said reciprocating devices may be operated for hilling, substantially as set forth.

29. A check-rowing mechanism having a wire-guide formed by a stationarily-mounted supporting-roller, a wire-retaining roller, a catch connected with said retaining-roller and adapted to engage with a stationary stop to hold the wire in position on the supporting-roller, whereby when the catch is released the force of the wire will substantially move the retaining-roller from its operative position, substantially as set forth.

30. In a planter, the combination, with the axle, the two-part covering-wheel, each of whose parts are adjustable toward and from vertical planes, of the frame having all of its parts outside of the space between the two parts of the covering-wheel, and arranged to hold the axle in a fixed position throughout its length, substantially as set forth.

31. In a planter, the combination, of the axle extending rigidly from end to end through all of its parts, a pair of covering-wheels, each made in two parts, and each of the parts of each covering-wheel being adjustable bodily along the axle, and the draft-frame connected to the axle between the inner parts of the covering-wheels, substantially as set forth.

32. In a planter, the combination of the axle, the supporting-wheel at one end of the axle, the supporting-wheel at the other end of the axle, means for adjustably connecting the wheel to the axle and varying its position relatively to a vertical plane, the seed-dropping mechanism, the driving-wheel for the seed-dropping mechanism on the axle, and means for transmitting to the driving-wheel motion from the adjustable ground-wheel, substantially as set forth.

33. In a planter, the combination, with the axle extending throughout all its parts rigidly from end to end, and lying on substantially straight lines, the draft-frame secured to the axle, a ground-wheel having its center supported by the axle, and a hub for the wheel adapted to be rocked relatively to the axle and secured thereto in either of several positions relative to the vertical planes, substantially as set forth.

34. In a planter, the combination of the axle, the draft-frame secured thereto, the ground-wheel centered on the axle and the hub for said wheel connected to the axle by a pivot, around which it is adjustable to either of several positions relatively to a vertical plane, substantially as set forth.

35. In a planter, the combination of the draft-frame, the non-rotary axle secured thereto, and the ground-wheel rotating around the axle and adjustable thereon to vary the inclination of its peripheral plane relative to the vertical planes transverse to the axle, substantially as set forth.

In testimony whereof I affix my signature in presence of two witnesses.

JOHN H. ELWARD.

Witnesses:
  M. B. MAY,
  N. CURTIS LAMMOND.